United States Patent
Dekker et al.

(10) Patent No.: US 7,992,211 B2
(45) Date of Patent: Aug. 2, 2011

(54) METHOD AND DEVICE FOR AUTHORISING CONDITIONAL ACCESS

(75) Inventors: Gerard Johan Dekker, EB Nieuw-Vennep (NL); Werner Stephanus Strydom, Amsterdam (NL); Albert Jan Bosscha, Hoofddorp (NL)

(73) Assignee: Irdeto Access B.V. (NL)

( * ) Notice: Subject to any disclaimer, the term of this patent is extended or adjusted under 35 U.S.C. 154(b) by 906 days.

(21) Appl. No.: 11/592,576

(22) Filed: Nov. 3, 2006

(65) Prior Publication Data

US 2007/0230700 A1    Oct. 4, 2007

(30) Foreign Application Priority Data

Mar. 31, 2006 (EP) .................................. 061121265

(51) Int. Cl.
*G06F 21/00* (2006.01)
*H04L 9/00* (2006.01)

(52) U.S. Cl. ......................................... 726/27; 380/241
(58) Field of Classification Search .................. 380/241; 726/26–30

See application file for complete search history.

(56) References Cited

U.S. PATENT DOCUMENTS

| | | | |
|---|---|---|---|
| 4,893,248 A | 1/1990 | Pitts et al. | |
| 6,035,038 A * | 3/2000 | Campinos et al. | 380/228 |
| 2002/0120928 A1* | 8/2002 | Wajs | 725/25 |
| 2003/0158814 A1 | 8/2003 | Cochard et al. | |
| 2005/0071866 A1* | 3/2005 | Louzir et al. | 725/31 |
| 2009/0150673 A1* | 6/2009 | DeFreese et al. | 713/170 |

FOREIGN PATENT DOCUMENTS

| | | |
|---|---|---|
| CN | 1379954 A | 11/2002 |
| CN | 1529987 A | 9/2004 |
| EP | 1094667 | 10/1999 |
| EP | 1 094 667 A1 | 4/2001 |
| EP | 1094667 | 4/2001 |

(Continued)

OTHER PUBLICATIONS

"European Search Report for Appln No. 6 11 2125", (Jul. 18, 2006).

(Continued)

*Primary Examiner* — Nasser Moazzami
*Assistant Examiner* — Lisa Lewis
(74) *Attorney, Agent, or Firm* — Schwegman, Lundberg & Woessner, P.A.

(57) ABSTRACT

A method of authorising conditional access to an encrypted digital data product, includes storing at least one set of entitlements in a secure device, each entitlement including a product identifier and expiry information, receiving entitlement control messages from a decoder system including a device for decrypting encrypted digital data products using control words, each entitlement control message including a product identifier, and in a first mode, returning at least one control word in response to an entitlement control message including a product identifier if the product identifier corresponds to a product identifier in a stored entitlement including expiry information indicating the entitlement to be valid, and, in a second mode, progressively adjusting a counter to a pre-determined value and returning at least one control word in response also to entitlement control messages including a product identifier if the product identifier corresponds to a product identifier in a stored entitlement including expiry information indicating expiry of the entitlement and if the counter is at a value between an initial value and the pre-determined value. The counter is set to an initial value to commence operation in the second mode upon receiving an entitlement control message including a product identifier corresponding to a product identifier in a stored entitlement that includes expiry information indicating expiry of the entitlement.

19 Claims, 3 Drawing Sheets

FOREIGN PATENT DOCUMENTS

| | | |
|---|---|---|
| EP | 1621955 | 2/2006 |
| WO | WO-02058398 | 7/2002 |
| WO | WO 02058398 A2 | 7/2002 |
| WO | WO-2006048856 | 5/2006 |

OTHER PUBLICATIONS

"Chinese Application Serial No. 200610149240.3, Office Action dated Feb. 5, 2010", 7 pgs.

"Mexican Application No. PA/A/2006/013302, Mexican Office Action mailed Mar. 5, 2010 (and English translation)", (May 26, 2010), 8 pgs.

Translation to English of: "Russian Application No. 2006140576, Office Action mailed Nov. 13, 2010", 3 pgs.

* cited by examiner

METHOD AND DEVICE FOR AUTHORISING CONDITIONAL ACCESS

CLAIM OF PRIORITY

The present patent application claims the priority benefit of the filing date of European Application (EPO) No. 06112126.5 filed Mar. 31, 2006, the entire content of which is incorporated herein by reference.

BRIEF DESCRIPTION OF THE DRAWINGS

An example embodiment will be explained in further detail with reference to the accompanying drawings, in which.

DETAILED DESCRIPTION

Figure 1:
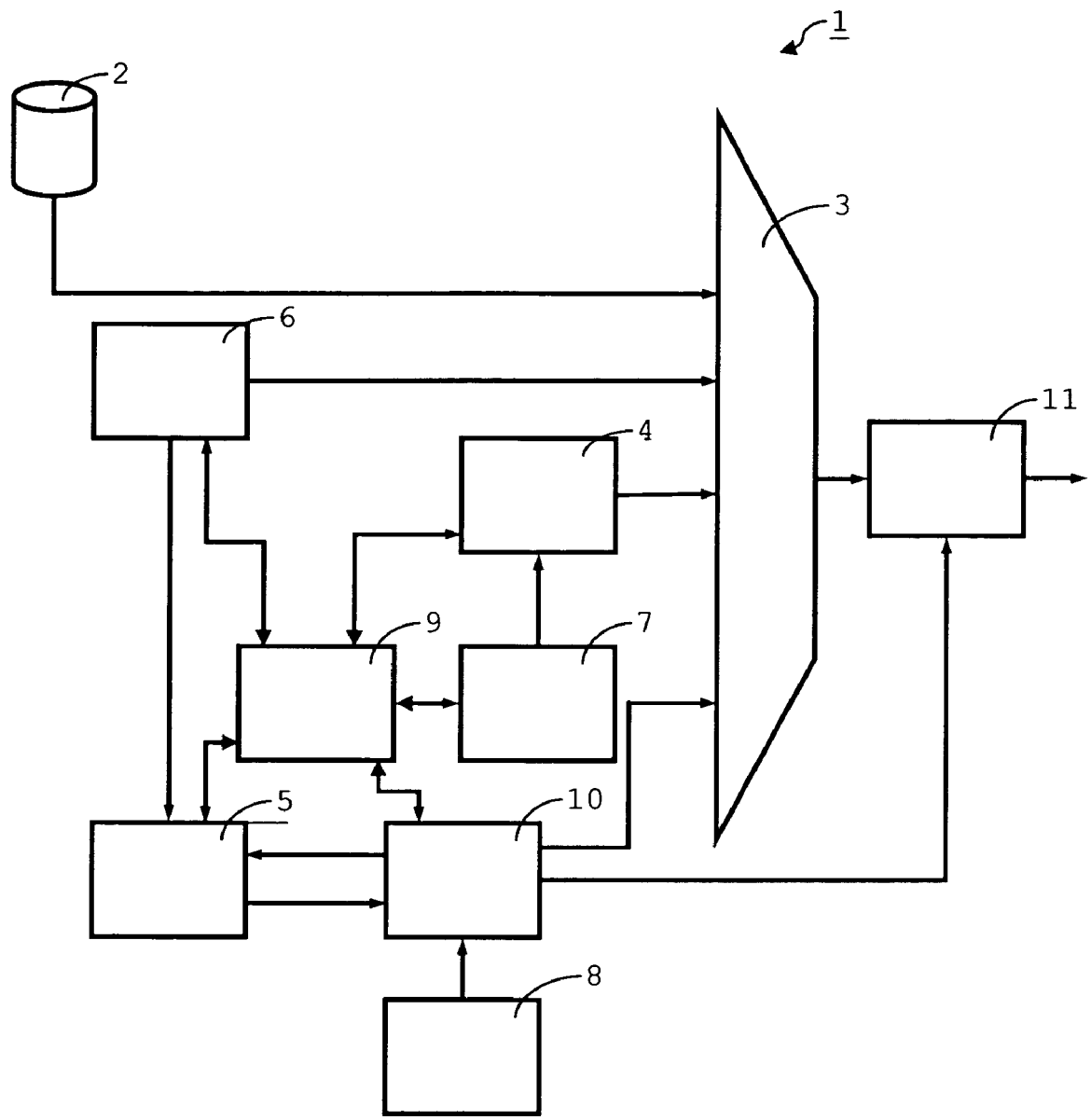
FIG. 1 illustrates in schematic fashion a head-end system including components of a conditional access system.

An example embodiment relates to a method of authorising conditional access to an encrypted digital data product, including storing at least one set of entitlements in a secure device, each entitlement including a product identifier and expiry information, receiving entitlement control messages from a decoder system including a device for decrypting encrypted digital data products using control words, each entitlement control message including a product identifier, and in a first mode, returning at least one control word in response to an entitlement control message including a product identifier if the product identifier corresponds to a product identifier in a stored entitlement including expiry information indicating the entitlement to be valid, and, in a second mode, progressively adjusting a counter to a pre-determined value and returning at least one control word in response also to entitlement control messages including a product identifier if the product identifier corresponds to a product identifier in a stored entitlement including expiry information indicating expiry of the entitlement and if the counter is at a value between an initial value and the pre-determined value.

An example embodiment also relates to a system for authorising conditional access to an encrypted digital data product, including an authorisation device, including secure memory for storing at least one set of entitlements, each entitlement including a product identifier and expiry information, and an interface to a decoder system including a device for decrypting encrypted digital data products, the interface enabling the authorisation device to receive entitlement control messages including respective product identifiers, wherein the authorisation device is arranged to operate in one of at least a first and a second mode, wherein, in the first mode, the authorisation device returns at least one control word in response to an entitlement control message received through the interface and including a product identifier if the product identifier corresponds to a product identifier in a stored entitlement including expiry information indicating the entitlement to be valid, and wherein, in the second mode, the authorisation device progressively adjusts a counter to a pre-determined value and returns at least one control word in response also to entitlement control messages received through the interface and including a product identifier if the product identifier corresponds to a product identifier in a stored entitlement including expiry information indicating expiry of the entitlement and if the counter is at a value between an initial value and the pre-determined value.

An example embodiment also relates to a digital message.

An example embodiment also relates to a computer program.

An example of embodiments of such a method and system is known from EP-A1-1 094 667. That document describes a method for operating a conditional access system for broadcast applications. The conditional access system comprises a number of subscribers, each having a terminal including a conditional access module and a secure device for storing entitlements, each entitlement indicating a service which the subscriber receiving the entitlement is allowed to watch. Entitlement Management Messages (EMMs) are sent to a secure device or group of secure devices, said EMMs each providing an entitlement and a corresponding expiry date. The entitlements are periodically refreshed in accordance with their expiry dates by sending EMMs updating the expiry dates. Expiry of an entitlement by not receiving a refreshment EMM is prevented by sending a set of extension EMMs to the entire base of secure devices. Each extension EMM indicates to a secure device that all entitlements within a pre-determined first period, i.e. with an expiry date within a specified number of days, can remain active for a predetermined second period. In this manner, the entitlements of all smart cards are extended for the second period.

A problem of the known method is that it is not very suitable for preventing "black-outs" if the subscriber's equipment is switched off for a relatively long time. Because EMMs, including extension EMMs, are sent relatively infrequently, a terminal that has been left switched off for a long time will start decoding the broadcast signal only after it has been turned on and left on for a relatively long time in order to receive the refreshment EMMs, or extension EMMs if the first period has not already passed. This problem has become more acute as broadcast services to mobile telephone handsets have started to be deployed, since these devices are often left off for a relatively long time to conserve battery power.

It is an object of one example embodiment to provide a method, system, digital message and computer program of the types mentioned above which help prevent the occurrence of long periods in which the encrypted digital data product cannot be accessed due to expired entitlements that could not be updated on time.

This object is achieved by means of the method according to one example embodiment which is characterised by setting the counter to an initial value to commence operation in the second mode upon receiving an entitlement control message including a product identifier corresponding to a product identifier in a stored entitlement that includes expiry information indicating expiry of the entitlement.

The secure device is a device provided with features for making it tamper-proof and/or tamper-evident, which features may be implemented in software or hardware. Thus, the secure device includes features for deterring unauthorised persons from changing the data stored therein. The expiry information may represent only a point in time, the indication of expiry or validity being given by the relation of the point in time to the current time or date as indicated by a timekeeping system in the secure device or decoder system. In that case, expiry information indicating the entitlement to be valid corresponds to an indication of a future point in time.

Because operation in the second mode commences upon receipt of an entitlement control message, any black-outs will last as long as normal, since the start of decryption is always delayed until the decoder system receives a control word from the authorisation device in response to a first entitlement control message. The product identifier corresponding to a product identifier in a stored entitlement that includes expiry information indicating that the entitlement has expired triggers the change to the second mode of operation. Thus, the counter is only initialised when needed. Because it is progressively adjusted, i.e. incremented or decremented towards a pre-determined value, and control words are only provided if the counter is at a value between the initial value and the pre-determined value, the extension of an or the expired entitlement(s) is for a limited period of use only. Thus, the conditional access cannot be circumvented in the long term.

In an embodiment, the initial value is based on a value stored in the secure device.

Thus, the availability of the second mode of operation is not dependent on receipt of a particular message within a particular period of time. The initial value defines the length of a grace period that can commence even if no external communications have been received for a long period of time.

In an embodiment, the initial value is obtained by searching for data stored in the secure device and indicating a multiple decoder mode and by multiplying a first value with a multiple derived from such data if such data is found.

Thus a longer period of grace is allowed for secure devices that have been authorised to operate in a multiple decoder mode. Such devices are suitable for use in conjunction with personal video recorders or integrated receiver decoders with a time-shift capability.

In an embodiment, the counter is adjusted by a pre-determined amount with each control word returned in the second mode.

This embodiment takes account of the so-called non-page locked mode of operation that occurs in an integrated receiver decoder when looking for the correct stream of Entitlement Control Messages (ECMs). In such a mode, the secure device is provided with many different ECMs until it starts returning control words. The above-mentioned feature of the method prevents the counter from reaching the pre-determined value too soon in the non-page locked mode.

In an embodiment, operation in the second mode is only commenced upon determining that each of the entitlements in the stored set of entitlements includes expiry information indicating expiry of the respective entitlement.

Thus a distinction is made between a situation where one entitlement has expired, because the subscriber is no longer authorised to access the associated product, and a situation wherein all entitlements have expired, because the secure device was unable to receive updated expiry information. It is noted that the secure device may store several sets of entitlements. For example, a smart card generally includes multiple sectors. The entitlements in one sector will generally correspond to a set of entitlements in the sense of the present description.

In an embodiment, in at least the first and the second mode, the expiry information included in an entitlement in the set of stored entitlements is updated in response to an entitlement management message of a first type, identifying the product corresponding to the product identifier included in the entitlement and forwarded by the decoder system to the secure device.

This limits the amount of time spent in the second mode of operation. The counter value does not reach the pre-determined value so fast.

In an embodiment, an entitlement is deleted from the set of stored entitlements upon receipt of an entitlement management message of a second type, identifying the product corresponding to the product identifier included in the entitlement and forwarded by the decoder system to the secure device.

This prevents the second mode of operation from being perpetuated in case of expiry of one entitlement due to the fact that the subscriber is no longer allowed to access the associated product.

In an embodiment, wherein the decoder system includes a tuner for retrieving entitlement management messages on a certain communications channel, the method includes providing a request to the decoder system to set the tuner to the certain communications channel after the operation in the second mode has commenced.

This ensures that there is sufficient time to receive any Entitlement Management Messages (EMMs) deleting or modifying entitlements in the set of stored entitlements. The amount of time spent in the second mode is further limited.

An embodiment includes switching from operation in the second mode to operation in the first mode upon determining that each of the stored entitlements in the set includes expiry information indicating that the entitlement is valid.

Thus, the pre-determined value of the counter is reached less quickly. Also, continuous operation is assured, since the provision of control words is stopped when the counter reaches the pre-determined value whilst the second mode still pertains.

In an embodiment, the initial value is based on a value obtained from a message forwarded by the decoder system to the secure device or on a value stored in the secure device and modified in response to a message forwarded by the decoder system to the secure device.

The message provides a means for re-initialising the initial value. This allows a potentially limitless number of prolonged periods of non-use of the secure device without the appearance of blackouts when use commences again.

According to another aspect, the system according to an example embodiment is characterised in that the authorisation device is configured to set the counter to an initial value to commence operation in the second mode upon receiving an entitlement control message including a product identifier corresponding to a product identifier in a stored entitlement that includes expiry information indicating expiry of the entitlement.

The initial value may be based on a value stored in the secure device or on a value included in the entitlement control message. Thus, a quick start of decryption is assured, whilst the fact that the involvement of the secure device is required ensures that access is still dependent on authorisation.

In an embodiment, the authorisation device is configured to carry out a method according to an example embodiment.

An embodiment of the system further includes a system for delivering to the authorisation device, via the decoder system and a network link to the decoder system, entitlement messages carrying information representative of a new counter value and arranged in a format to prompt the authorisation device to base the initial value on the new counter value.

This allows a potentially limitless number of prolonged periods of non-use of the secure device without the appearance of blackouts when use commences again.

According to another aspect of an example embodiment, there is provided a digital message for transmission over a data link from a server to at least one of the decoder system and the authorisation device as comprised in the definition of the system according to an example embodiment, carrying information representative of a new counter value and arranged in a format to prompt the authorisation device to base the initial value on the new counter value.

According to another aspect of an example embodiment, a computer program includes a set of instructions capable, when incorporated in a machine-readable medium, of causing a system having information processing capabilities to perform a method according to an example embodiment.

A head-end system 1, shown as an example in FIG. 1, is suitable for generating encrypted digital data products and entitlement messages for use in decrypting the encrypted digital data products. In one embodiment, the encrypted digital data products are files, provided with separate information implementing a Digital Rights Management (DRM) system. Such information specifies the types of use that may be made of the encrypted data product. The files may be recorded on a data carrier, such as an optical or magnetic disk. Alternatively, they may be downloaded by a receiver over a communications network, including, for example a cellular mobile telephone network, a satellite network and/or a cable or terrestrial broadcast network. In another embodiment, as illustrated in FIG. 1, the encrypted digital data product includes a set of one or more digital data streams, constituted by digital data packets including a header and a payload. The header contains an identifier indicating the stream to which the data packet concerns belongs. In a common implementation, to be used herein for illustrative purposes, the digital data product is a product including one or more MPEG-2 transport streams. The form of such a data stream is known per se, for example from international standard ISO/IEC 13818-1. The encrypted product comprising one or more streams of encrypted Transport Stream (TS) packets is provided as a unicast, multicast or broadcast to receivers over any one or more of a cellular mobile telephone network—in that case the TS packets are carried in Internet Protocol (IP) packets, for example—, and a satellite, cable or terrestrial broadcast network.

The head-end system 1 illustrated in FIG. 1 is in accordance with the Simulcrypt standard for Digital Video Broadcasting. A digital data stream including one or more elementary streams of content data, e.g. video and audio components, belonging to a programme is obtained from a storage system 2. A programme in this context is a collection of data streams. Those of the data streams provided with a time base have a common time base, and are intended for synchronised presentation as indicate by timing information in the elementary streams.

A multiplexing system 3 performs time multiplexing of input data streams and provides an MPEG-2 Transport Stream as output. The MPEG-2 Transport Stream is formed by a sequence of TS packets. The payload of each packet carries one or more units of data belonging to a single elementary stream.

Besides the elementary streams from the storage system 2, the multiplexing system 3 receives Program Specific Information (PSI) from a PSI generator 4, a stream of Entitlement Control Messages (ECMs) from an ECM generator 5 and a stream of Entitlement Management Messages (EMMs) from an EMM generator 6. A provider of Conditional Access (CA provider) operates a custom PSI generator 7, which provides program specific information to the PSI generator 4. The conditional access systems (not shown) of several other CA providers may be included in the head-end system 1, for which reason both the PSI generator 4 and the custom PSI generator 7 are present. The illustrated systems associated with the conditional access system of one CA provider include the custom PSI generator 7, the ECM generator 5 and the EMM generator 6.

The head-end system 1 further includes a Control Word (CW) generator 8 for generating a sequence of encryption keys, referred to herein as control words. A network management system 9 controls the operation of the various components.

Control words generated by the CW generator 8 are provided to a synchronisation system 10. The synchronisation system 10 provides the control words to the ECM generator, receiving the ECMs in return. Each ECM includes at least one set of key information enabling an authorisation device of the conditional access system to obtain a control word from it. The ECMs are provided in a separately identified stream of TS packets in the multiples generated by the multiplexing system. They are linked to the programmes to which they provide access by means of the Program Specific Information included in the multiplex.

The synchronisation system 10 also provides the control words to a scrambling system 11, which scrambles at least parts of the payloads of at least certain ones of the MPEG-2 TS packets obtained as output from the multiplexing system 2. One function performed by the synchronisation system 10 is to synchronise the stream of ECMs with the scrambled MPEG-2 transport stream. Synchronisation is, in one embodiment, effected by means of time stamps in the MPEG-2 TS packets, thereby providing the TS packets carrying the ECMs and the scrambled TS packets carrying content data with a common time base. Synchronisation may be effected by the order in which the streams of TS packets carrying the ECMs and of those carrying the scrambled content data are multiplexed, in combination with a system for maintaining the order of TS packets in the multiplex. It is observed that, in other embodiments, the key messages are played out over a separate channel, and that a reference time is used to synchronise this stream of key messages with the stream of TS packets carrying scrambled content data.

In the illustrated implementation, the ECMs carry data representative of the control words and encrypted under a session key. The ECM generator 5 obtains the session key from the EMM generator 6, which includes the session keys in EMMs of a key-carrying type, addressed to subscribers or groups of subscribers, or more accurately, access tokens issued to the subscribers. The EMMs of all types to be discussed herein are sent to subscribers in a known manner within the MPEG-2 transport stream produced by the multiplexing system 3.

The scrambling system 11 scrambles at least parts of the payloads of TS packets. A different control word value is used for successive sections of the programme corresponding to control word periods. Data in the ECMs, including the synchronisation information, links the encrypted control words to the relevant control word periods, so that a receiver will be able to obtain the correct control word value for decrypting a certain section of the programme. This is true also for encrypted digital data products comprising files rather than data streams. The file can also be partitioned into an ordered sequence of sections, of which successive ones are encrypted under different control word values.

The multiplex produced by the multiplexing system 3 includes a plurality of sets of streams corresponding to respective programmes. Each set of streams corresponding to a programme is encrypted independently of the other programmes, and has its own sequence of ECMs. The ECMs associated with different programmes may be carried in one TS packet stream (i.e. in packets with a common packet identifier in their header). Each ECM carries, along with a set of key information enabling the retrieval of a control word, a product identifier, unique to the programme and associated with the set of key information in the ECM.

Figure 2:
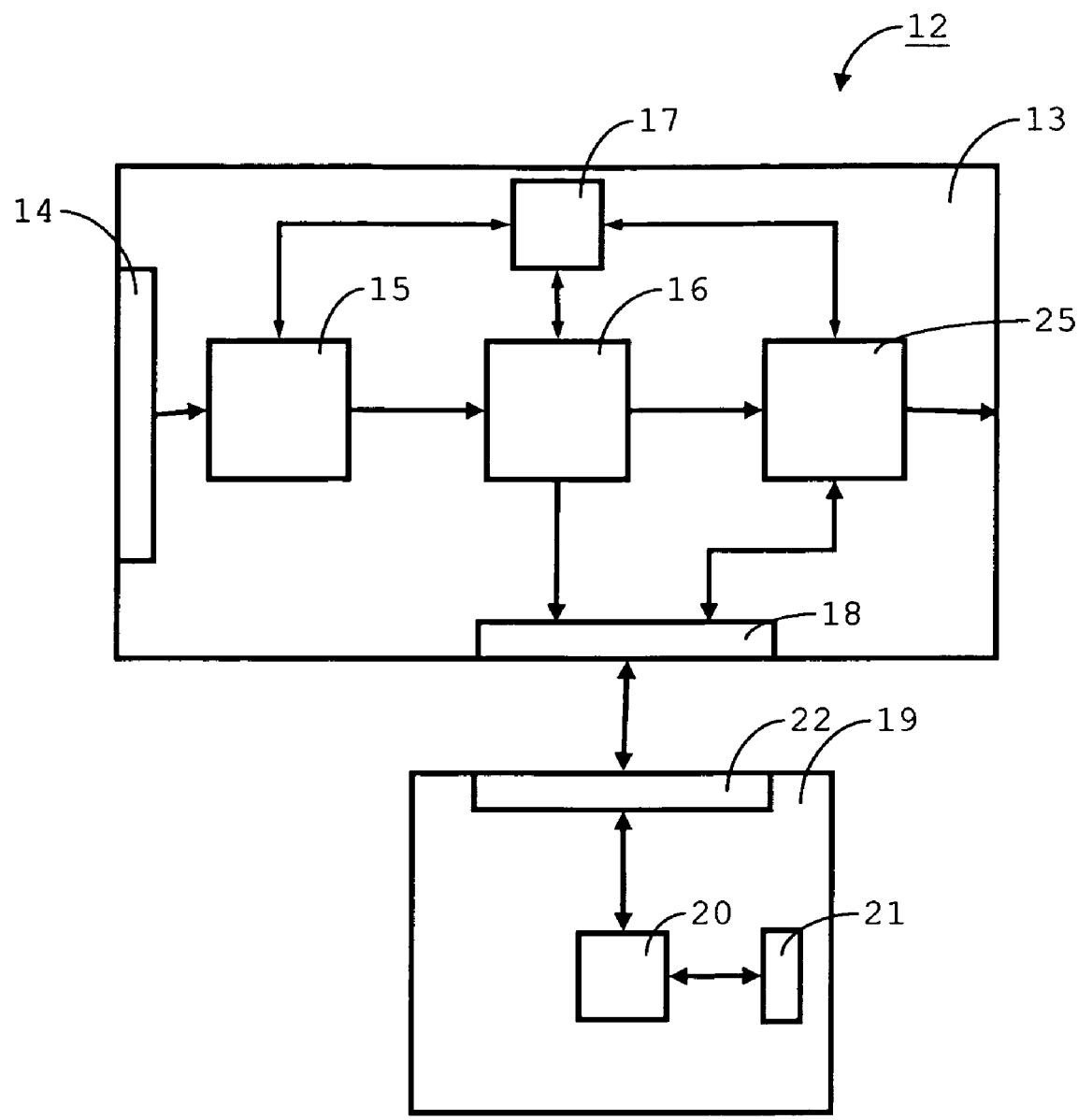
FIG. 2 illustrates in schematic fashion a receiver/decoder in combination with a further part of the conditional access system.

FIG. 2 illustrates in very schematic fashion subscriber equipment 12 including a receiver/decoder 12. It is to be understood that the systems and methods described here are in particular amenable to implementation in subscriber equipment comprised in a mobile device, such as a cellular telephone handset (not shown). This is because the subscriber equipment need not continuously be in a mode in which it receives data from the head-end, in particular the EMMs and ECMs. The effect is that battery power is conserved in mobile devices.

In the illustrated embodiment, the receiver/decoder 12 includes a network interface 14 and a tuner/demodulator 15 for implementing a physical link to the head-end system 1. This embodiment is appropriate for transmission over a satellite, cable or terrestrial broadcast link. In other embodiments, as stated, the link would be over a cellular telephone network, in which case the physical interface to the network would be different.

A demultiplexer 16 filters out the TS packets belonging to a programme as directed by a processing unit 17. In a known manner, a programme map table in the digital data stream obtained from the tuner/demodulator 15 contains packet identifier values corresponding to those in the headers of the TS packets belonging to the programme and to the streams of ECMs and EMMs. Thus, EMMs, ECMs, and TS packets with at least partially scrambled payloads are obtained.

The receiver/decoder 13 includes an interface 18 to an authorisation device, an access token, in the shape of a smart card 19. The smart card 19 is only one example of such an authorisation device. In other embodiments, a combination of a conditional access module and a smart card is used. In another embodiment, the functionality of the smart card 19 is provided on a sector of a Subscriber Identity Module (SIM) card of a mobile telephone handset. In yet another embodiment, the functionality of the smart card 19 is embodied in an access token comprising a software module for execution by the processing unit 17 or another processor within the receiver/decoder 13. In such an embodiment, code and/or data obfuscation techniques are used to make the system comprising the processing unit 17 and the executable code of the software module secure against attempts to reverse engineer the code. A separate physical authorisation device can be dispensed with. In the usual case, additional protective hardware features will be provided to protect the memory and data processing unit of the authorisation device, such as a processing unit 20 and non-volatile memory 21 of the smart card 19, shown here as separate components.

In the illustrated embodiment, the interface 18 of the receiver/decoder 13 co-operates with an interface 22 of the smart card 19, which is thus a separate, portable authorisation device.

Figure 3:
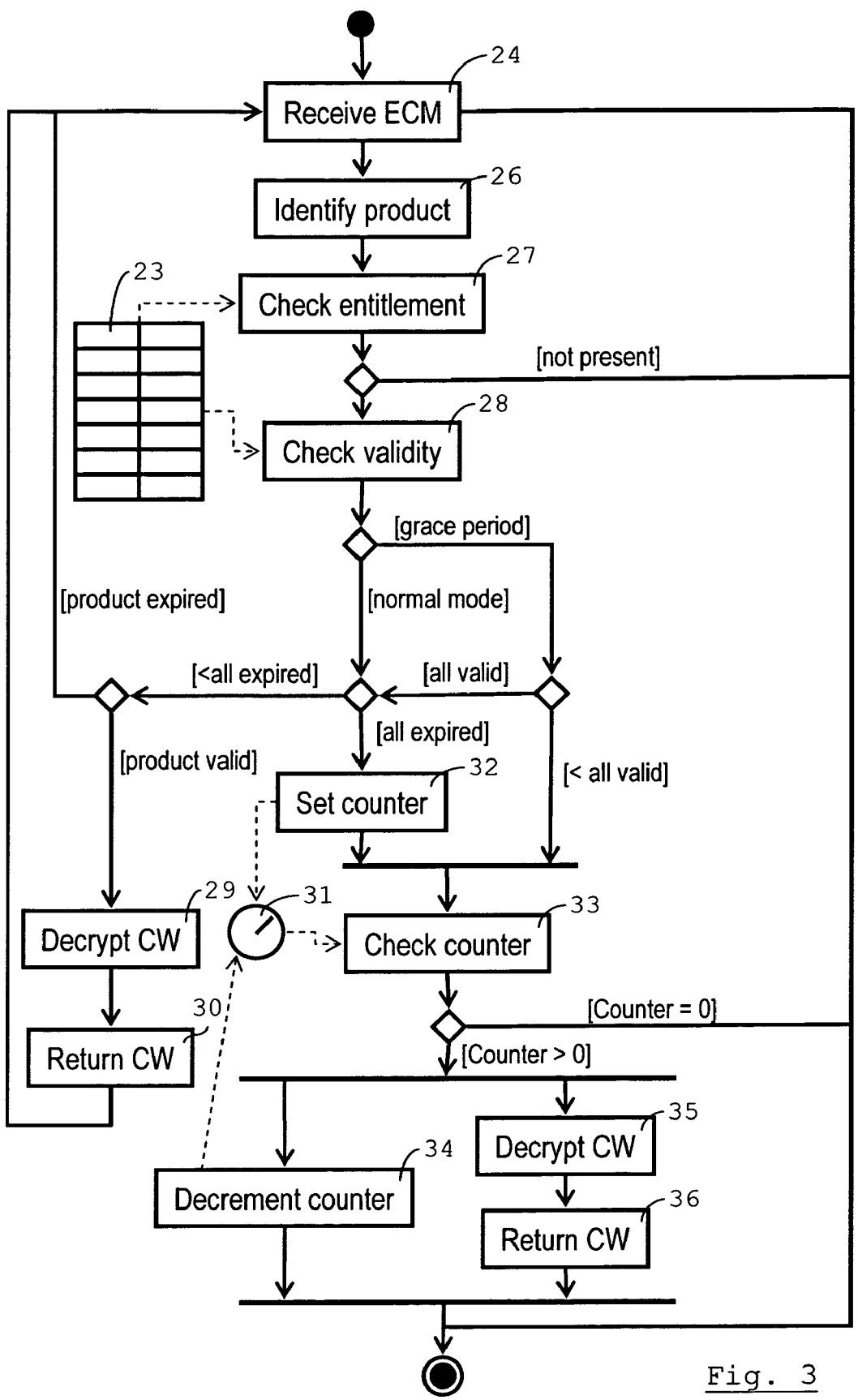
FIG. 3 is a flow chart illustrating a number of steps in a method of authorising conditional access.

FIG. 3 illustrates an example of a method carried out by the smart card 19 which functions as an authorisation device in the conditional access system. Computer program code stored in the smart card 19 configures the smart card 19 to carry out the illustrated method. The smart card 19 stores a table 23 of entitlements in its memory 21. Each entry in the table 23 corresponding to an entitlement includes a product identifier and data representative of a point in time, for example a date and, optionally, a time.

It is noted that the smart card 19 may store several tables such as the illustrated table 23. This would be the case where the smart card 19 includes multiple sectors. Each table 23 thus forms a separate set of entitlements, each set generally belonging to a different CA provider.

The table 23 is populated with entries in response to EMMs of a first type. These EMMs are also generated by the EMM generator 6 of the conditional access system. They include data representative of the product identifier and associated expiry information. Entitlements are removed from the table 23 upon receipt of an EMM of a second type, identifying the product concerned, and forwarded by the receiver/decoder 13 to the smart card 19. To obtain the EMMs of the first and second type, as well as the key-carrying EMMs, the processing unit 17 provides the appropriate tuning commands to the tuner/demodulator and/or the demultiplexer 16. The latter's involvement is required because the EMMs are generally sent on a separate channel (i.e. in a separately identified TS packet stream in the multiplex). In embodiments where the EMMs are received out of band, another type of tuning command is issued by the processing unit to another type of tuning arrangement (not shown).

EMMS of the first type, which include EMMs updating the expiry information included in entitlements already stored in the table 23, are sent at intervals of upwards of fifteen minutes to the receiver/decoder 12. Thus, the receiver/decoder 12 must be switched on and tuned for quite a long period to be sure of obtaining a complete update of the entitlements in the table 23. If the subscriber equipment 12 is only used for short intervals of time, there is quite a high chance that not all entitlements in the table 23 will have been updated. A CA provider may also choose to grant entitlements for short periods of time, for security reasons. This also increases the likelihood that one or more of the entitlements in the table 23 will expire before an EMM of the first type to renew the entitlement is forwarded to the smart card 19.

To allow continued access to a programme even if the entitlement for the programme has expired, the smart card 19 is able to implement a so-called grace period. For as long as the grace period lasts, the smart card 19 operates in a mode referred to herein as the second mode of operation, to distinguish it from the first or normal mode of operation.

The detailed embodiment illustrated in FIG. 3 of the method used by the smart card 19 is used merely as an example here. In a first step 24, the smart card 19 receives an ECM. The ECM is forwarded by the receiver/decoder 13 to the smart card 19 via the interfaces 18,22. It includes a product identifier and at least one set of encrypted key information corresponding to a control word for use by a descrambler 25 to decrypt a section of the programme stream corresponding to a control word period. In a second step 26, the smart card 19 retrieves the product identifier from the ECM.

In a third step 27, the smart card 19 checks for the presence of an entitlement including a corresponding product identifier in the table 23. Regardless of whether the smart card 19 is operating in the first or second mode, the smart card 19 only proceeds to decrypt and return the control word in the EMC if the product identifier in the ECM corresponds to a product identifier in an entitlement in the table 23. Thus, if no such entitlement is present, the method is resumed at the first step 24 wherein a next ECM is received.

If the entitlement identified in the ECM is found, then the smart card 19 checks the validity of at least that entitlement. In the illustrated embodiment, at least if the entitlement corresponding to the identified product has expired, the smart card 19 checks the validity of all entitlements included in the table 23. The validity check is carried out in a fourth step 28. In one embodiment, the smart card 19 implements a real-time clock and the expiry information included in each entitlement indicates a point in time. Thus, whether the expiry information indicates expiry of an entitlement or that it is valid is determined by carrying out a comparison with a value of the current time, obtained from the real-time clock. In another embodiment, the current time is the time as derived from a time stamp in the ECM by the smart card 19. In another embodiment, the expiry information is a counter and the counter is adjusted by a pre-determined amount with each ECM received and processed to generate a control word for decrypting a section of the product identified in the entitlement.

In the illustrated embodiment, if the smart card 19 is in the normal mode of operation and the entitlement including a product identifier corresponding to the product identifier in the ECM has expired, but not all other entitlements, then the ECM is not processed further. The first step 24 is carried out on a next ECM. On the other hand, if the smart card 19 is in the normal mode of operation and the entitlement including a product identifier corresponding to the product identifier in the ECM includes expiry information indicating the entitlement to be valid, a step 29 of decrypting the set of key information in the ECM is carried out, followed by a step 30 of returning the clear control word in a message to the descrambler 25.

In the illustrated embodiment, if the entitlement including a product identifier corresponding to the product identifier in the ECM includes expiry information indicating that the entitlement has expired, and if all other entitlements in the table 23 have similarly expired, then the smart card enters the second mode of operation. A grace period commences. Incidentally, in another embodiment, the grace period already commences if only the entitlement of the product identified in the ECM has expired. In yet other embodiments, there may be a threshold number of expired entitlements above which the smart card 19 commences operation in the second mode.

To commence operation in the second mode, a counter 31 is set to an initial value (step 32). In one variant, the initial value is derived from a value encoded in the ECM received in the first step 24. In this embodiment, the ECM is thus used as a digital message for transmission from the head-end system 1 to the smart card 19, and carries information representative of a new counter value. The ECM is in the appropriate format to prompt the smart card 19 to base the initial value of the counter 31 on the new counter value. In another embodiment, the initial value is based on a value stored in memory 21 in the smart card 19. The value stored in memory 21 is programmed at initialisation of the smart card 19. To avoid having to return the smart card 19, the value stored in memory 21 is updated upon receipt of an EMM of a third type. In one embodiment, the new value to replace the value stored in memory 21 is encoded in the EMM. Thus, the head-end system 1 transmits a digital data message in the form of the EMM of the third type to prompt the smart card 19 to replace the stored value by a new value.

In certain embodiments, the subscriber equipment 12 includes the functionality to decrypt multiple programmes substantially simultaneously. These embodiments include personal video recorders and set-top boxes or digital television sets with time-shifting capabilities. The single smart card 19 is used to authorise decryption of each of these programmes, if the appropriate entitlement is present, i.e. the entitlement to grant access to multiple encrypted programmes. In that case, the initial value is obtained by multiplication with an integer representative of the number of products that may be decrypted simultaneously.

Whilst the smart card is operating in the second mode, the smart card checks (step 33) whether the counter 31 has a value between the initial value and a pre-determined final value, nil in the example. If that is the case, then the counter is adjusted by a pre-determined amount (step 34), provided steps 35,36 of decrypting the control word and returning the decrypted control word to the receiver/decoder 13 are also carried out. Only if a control word is returned, is the counter 31 decremented. The effect is that the counter 31 does not reach value nil very rapidly when the smart card operates in a non-pagelocked mode. In the non-pagelocked mode, the processing unit 17 of the receiver/decoder 13 does not filter the ECMs retrieved by the demultiplexer 16 by product identifier, but provides ECMs including different product identifiers.

The smart card 19 continues in the second mode of operation until all entitlements included in the table 23 have been either deleted or provided with new expiry information indicating the entitlement to be valid. Then, if upon carrying out the third step 27, it is determined that the expiry information in all entitlements of the table indicates the entitlement concerned to be valid, the smart card 19 switches from the second mode of operation to the first mode of operation. Information representative of the current value of the counter 31 is stored (not shown explicitly in FIG. 3) in memory 21.

In at least one embodiment, after commencing operation in the second mode, the smart card 19 issues a request to the receiver/decoder 13 to stay tuned to the channel (i.e. elementary stream) over which the EMMs of the second type are transmitted. In one embodiment, the request specifies a time period or set of product identifiers to ensure that the received/decoder 13 stays tuned long enough. In another embodiment, an error message is returned to the receiver/decoder 13 with the step 32 of setting the counter, and the error message results in an output on a user interface of the receiver/decoder 13. This output forms a request to the user not to switch off the subscriber equipment 12 for a certain period of time.

Thus, it is ensured that the entitlements stored in the table 23 are updated whilst the smart card 19 continues to authorise decryption of the product desired by the subscriber. Blackouts are prevented. A consequent effect is that telephone calls to a help-desk or subscriber management centre in order to renew entitlements are avoided.

The invention is not limited to the embodiments described herein in detail, but may be varied within the scope of the accompanying claims. For example, where a digital data product is encrypted using an asymmetric cipher, the ECMs will include keys forming a key pair with the key used to encrypt the digital data product or part of the digital data product. The descrambler 25 may be included in the smart card 19, or in a separate conditional access module interfacing between the smart card 19 and the receiver/decoder 13. In an embodiment implementing a DRM system, the smart card 19 issues decryption keys in a digital rights management object in response to a request including a product identifier, which request corresponds to an ECM. The digital rights management object includes a key corresponding to a control word in the embodiment that has been described herein in detail.

The invention claimed is:

1. A method of authorising conditional access to an encrypted digital data product, including
storing at least one set of entitlements in a secure device, each entitlement including a product identifier and expiry information;
receiving entitlement control messages from a decoder system including a device for decrypting encrypted digital data products using control words, each entitlement control message including a product identifier;
in a first mode, returning at least one control word in response to an entitlement control message including a product identifier if the product identifier corresponds to a product identifier in a stored entitlement including expiry information indicating the entitlement to be valid;

setting a counter to an initial value to commence operation in a second mode upon receiving an entitlement control message including a product identifier corresponding to a product identifier in a stored entitlement that includes expiry information indicating that the entitlement is expired; and in the second mode, progressively adjusting the counter to a pre-determined value and returning at least one control word in response also to entitlement control messages including a product identifier if the product identifier corresponds to a product identifier in a stored entitlement including expiry information indicating that the entitlement is expired and if the counter is at a value between the initial value and the pre-determined value.

2. A method according to claim 1, wherein the initial value is based on a value stored in the secure device.

3. A method according to claim 1, wherein the initial value is obtained by searching for data stored in the secure device and by multiplying a first value with a multiple derived from such data if such data is found.

4. A method according to claim 1, wherein the counter is adjusted by a pre-determined amount with each control word returned in the second mode.

5. A method according to claim 1, wherein operation in the second mode is only commenced upon determining that each of the entitlements in the stored set of entitlements includes expiry information indicating that the respective entitlement is expired.

6. A method according to claim 1, wherein, in at least the first and the second mode, the expiry information included in an entitlement in the set of stored entitlements is updated in response to an entitlement management message of a first type, identifying the product corresponding to the product identifier included in the entitlement and forwarded by the decoder system to the secure device.

7. A method according to claim 1, wherein an entitlement is deleted from the set of stored entitlements upon receipt of an entitlement management message of a second type, identifying the product corresponding to the product identifier included in the entitlement and forwarded by the decoder system to the secure device.

8. A method according to claim 1, wherein the decoder system includes a tuner for retrieving entitlement management messages on a certain communications channel, the method including providing a request to the decoder system to set the tuner to the certain communications channel after the operation in the second mode has commenced.

9. A method according to claim 1 including switching from operation in the second mode to operation in the first mode upon determining that each of the stored entitlements in the set includes expiry information indicating that the entitlement is valid.

10. A method according to claim 1, wherein the initial value is based on a value obtained from a message forwarded by the decoder system to the secure device or on a value stored in the secure device and modified in response to a message forwarded by the decoder system to the secure device.

11. A method according to claim 1, wherein returning the at least one control word in the second mode includes returning the control word without adjusting the stored entitlements to include the expiry information indicating the entitlement to be valid.

12. A system for authorising conditional access to an encrypted digital data product, including an authorisation device, including secure memory for storing at least one set of entitlements, each entitlement including a product identifier and expiry information, and an interface to a decoder system including a device for decrypting encrypted digital data products, the interface enabling the authorisation device to receive entitlement control messages including respective product identifiers, wherein, when operating in a first mode, the authorisation device returns at least one control word in response to an entitlement control message received through the interface and including a product identifier if the product identifier corresponds to a product identifier in a stored entitlement including expiry information indicating the entitlement to be valid, wherein the authorisation device is configured to set a counter to an initial value to commence operation in a second mode upon receiving an entitlement control message including a product identifier corresponding to a product identifier in a stored entitlement that includes expiry information indicating that the entitlement is expired, and wherein, when operating in the second mode, the authorisation device progressively adjusts the counter to a pre-determined value and returns at least one control word in response also to entitlement control messages received through the interface and including a product identifier if the product identifier corresponds to a product identifier in a stored entitlement including expiry information indicating that the entitlement is expired and if the counter is at a value between the initial value and the pre-determined value.

13. A system according to claim 12, wherein the authorisation device is configured to carry out a method of authorising conditional access to an encrypted digital data product, including storing at least one set of entitlements in a secure device, each entitlement including a product identifier and expiry information;

receiving entitlement control messages from a decoder system including a device for decrypting encrypted digital data products using control words, each entitlement control message including a product identifier;

in a first mode, returning at least one control word in response to an entitlement control message including a product identifier if the product identifier corresponds to a product identifier in a stored entitlement including expiry information indicating the entitlement to be valid;

setting a counter to an initial value to commence operation in a second mode upon receiving an entitlement control message including a product identifier corresponding to a product identifier in a stored entitlement that includes expiry information indicating that the entitlement is expired; and in the second mode, progressively adjusting the counter to a pre-determined value and returning at least one control word in response also to entitlement control messages including a product identifier if the product identifier corresponds to a product identifier in a stored entitlement including expiry information indicating that of the entitlement is expired and if the counter is at a value between an initial value and the pre-determined value.

14. A system according to claim 12, further including a system for delivering to the authorisation device, via the decoder system and a network link to the decoder system, entitlement messages carrying information representative of a new counter value and arranged in a format to prompt the authorisation device to base the initial value on the new counter value.

15. A system according to claim 12, wherein returning the at least one control word in the second mode includes returning the control word without adjusting the stored entitlements to include the expiry information indicating the entitlement to be valid.

16. A system comprising:

a head-end system operable to generate a digital message for transmission over a data link from a server to at least one of a decoder system and an authorisation device, the authorization device including secure memory for storing at least one set of entitlements, each entitlement including a product identifier and expiry information, and an interface to the decoder system including a device for decrypting encrypted digital data products, the interface enabling the authorisation device to receive entitlement control messages including respective product identifiers, wherein, when operating in a first mode, the authorisation device returns at least one control word in response to an entitlement control message received through the interface and including a product identifier if the product identifier corresponds to a product identifier in a stored entitlement including expiry information indicating the entitlement to be valid, wherein the authorisation device is configured to set a counter to an initial value to commence operation in a second mode upon receiving an entitlement control message including a product identifier corresponding to a product identifier in a stored entitlement that includes expiry information indicating that the entitlement is expired, wherein, in the second mode, the authorisation device progressively adjusts the counter to a pre-determined value and returns at least one control word in response also to entitlement control messages received through the interface and including a product identifier if the product identifier corresponds to a product identifier in a stored entitlement including expiry information indicating that the entitlement is expired and if the counter is at a value between the initial value and the pre-determined value, and the digital message carrying information representative of a new counter value and arranged in a format to prompt the authorisation device to base the initial value on the new counter value.

17. A system according to claim 16, wherein returning the at least one control word in the second mode includes returning the control word without adjusting the stored entitlements to include the expiry information indicating the entitlement to be valid.

18. A non-transitory computer-readable storage medium including a set of instructions capable of causing a system having information processing capabilities to perform a method including:

storing at least one set of entitlements in a secure device, each entitlement including a product identifier and expiry information;

receiving entitlement control messages from a decoder system including a device for decrypting encrypted digital data products using control words, each entitlement control message including a product identifier;

in a first mode, returning at least one control word in response to an entitlement control message including a product identifier if the product identifier corresponds to a product identifier in a stored entitlement including expiry information indicating the entitlement to be valid;

setting a counter to an initial value to commence operation in a second mode upon receiving an entitlement control message including a product identifier corresponding to a product identifier in a stored entitlement that includes expiry information indicating that the entitlement is expired; and in the second mode, progressively adjusting the counter to a pre-determined value and returning at least one control word in response also to entitlement control messages including a product identifier if the product identifier corresponds to a product identifier in a stored entitlement including expiry information indicating that of the entitlement is expired and if the counter is at a value between the initial value and the pre-determined value.

19. A non-transitory computer-readable storage medium according to claim 18, wherein returning the at least one control word in the second mode includes returning the control word without adjusting the stored entitlements to include the expiry information indicating the entitlement to be valid.

* * * * *